United States Patent [19]
Weigel

[11] Patent Number: 5,692,998
[45] Date of Patent: Dec. 2, 1997

[54] TOOL DATA CARRIER FOR ATTACHMENT TO A TOOL CARRIER

[75] Inventor: Richard Weigel, Lahnau, Germany

[73] Assignee: Guenter Wolni, Giessen, Germany

[21] Appl. No.: 631,668

[22] Filed: Apr. 9, 1996

[30] Foreign Application Priority Data

Apr. 11, 1995 [DE] Germany ............... 295 05 853 U

[51] Int. Cl.$^6$ ............................................. B23Q 3/157
[52] U.S. Cl. ................. 483/12; 40/913; 279/126; 483/9
[58] Field of Search .................... 483/1, 8, 9, 12, 483/5; 279/126; 40/913; 364/474.21; 340/680; 409/234

[56] References Cited

U.S. PATENT DOCUMENTS

| | | | |
|---|---|---|---|
| 4,586,615 | 5/1986 | Quitmann | 220/23.4 X |
| 4,588,339 | 5/1986 | Bilz | 483/9 X |
| 4,850,766 | 7/1989 | Furuhashi | 409/234 |
| 5,257,199 | 10/1993 | Tsujino et al. | 364/474 |

FOREIGN PATENT DOCUMENTS

| | | | |
|---|---|---|---|
| 3008467 | 9/1981 | Germany | 483/9 |
| 102650 | 6/1983 | Japan | 483/9 |
| 193738 | 8/1987 | Japan | 483/9 |
| 1113214 | 9/1984 | U.S.S.R. | 483/9 |

*Primary Examiner*—William R. Briggs
*Attorney, Agent, or Firm*—W. G. Fasse; W. F. Fasse

[57] ABSTRACT

A data carrier in the form of an elastic ring segment has a radially outwardly facing surface to which the data providing tool information, are applied for example by printing. The ring segment has at least one radially inwardly effective connector element that forms a snap-on connector for securing the data carrier in an elastic, releasable manner to a connector area of a tool carrier to provide an elastic, interlocking form-fit between the data carrier and the tool carrier. Thus, the data carrier can be easily exchanged or replaced in accordance with the type of tool carried by the tool carrier.

17 Claims, 6 Drawing Sheets

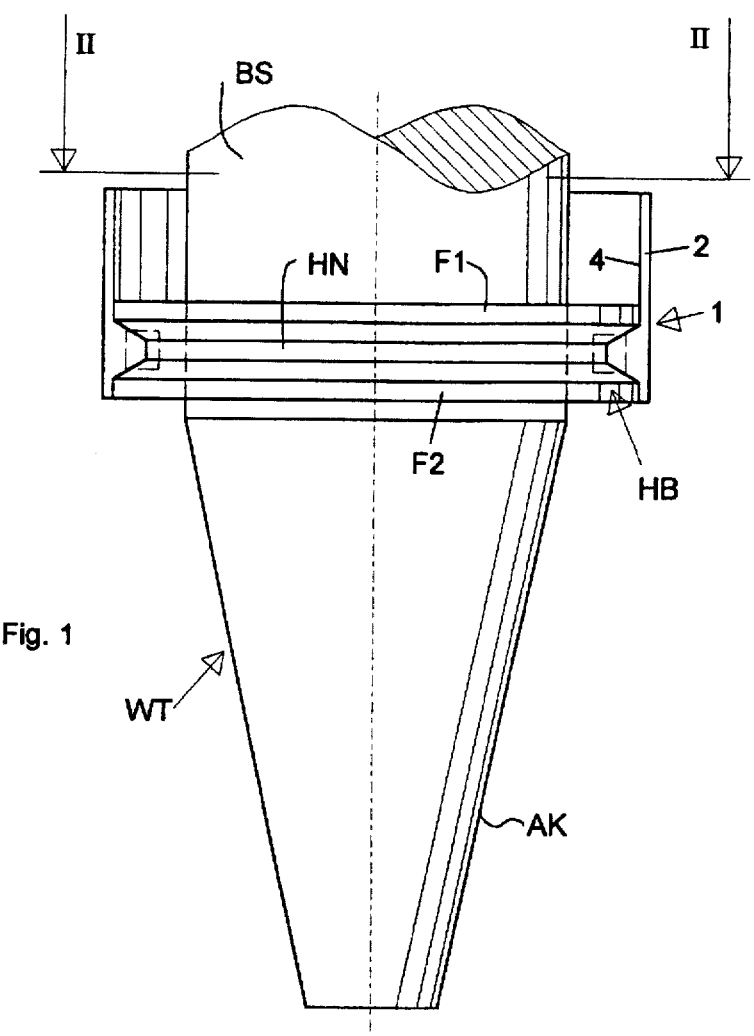
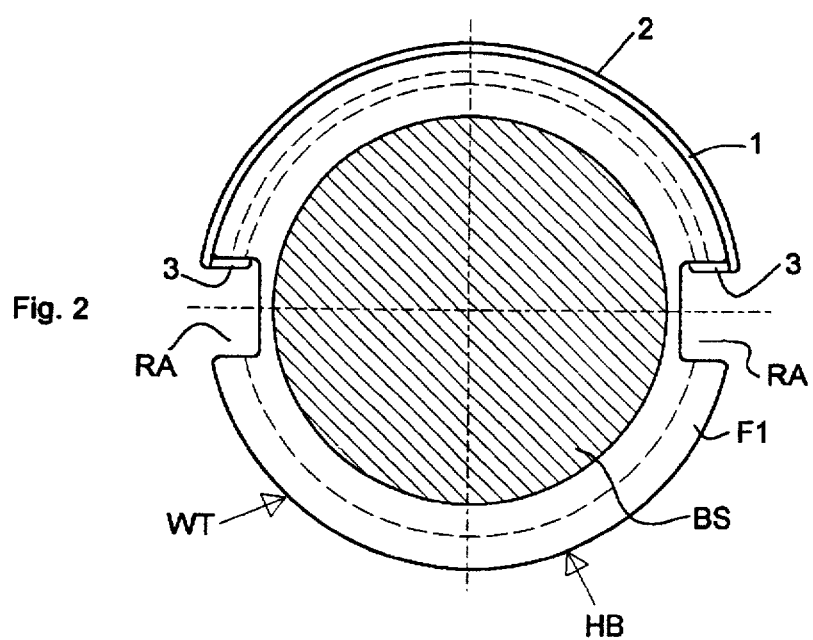
Fig. 1
Fig. 2

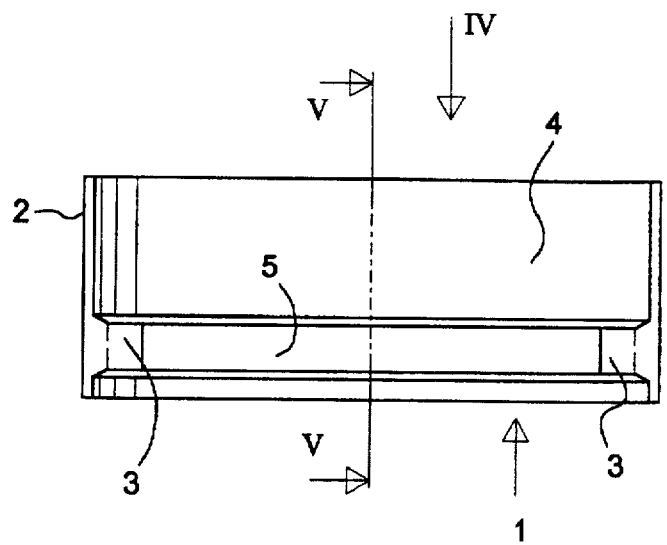
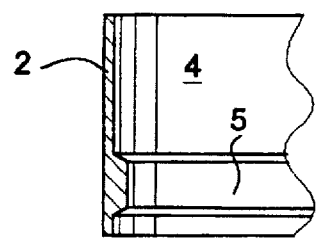
Fig. 3
Fig. 5
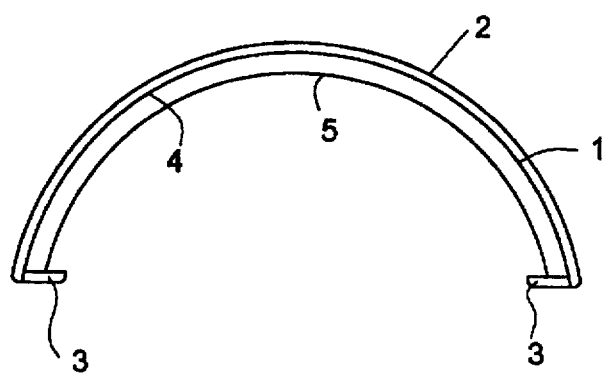
Fig. 4

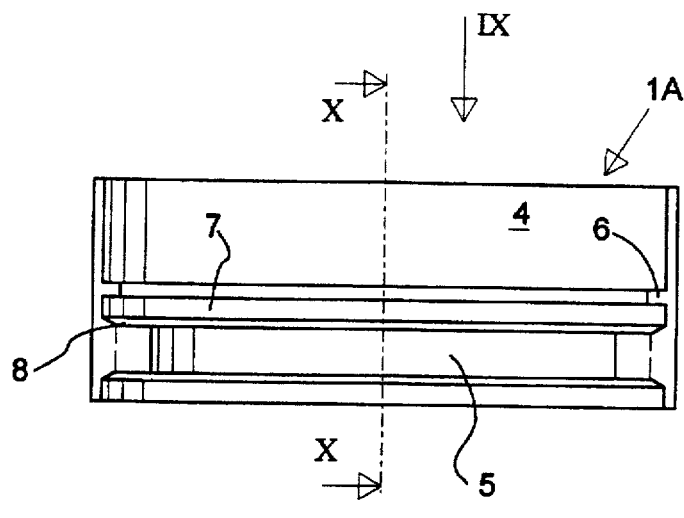
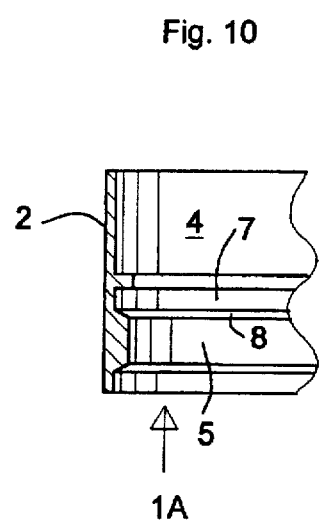
Fig. 8
Fig. 10
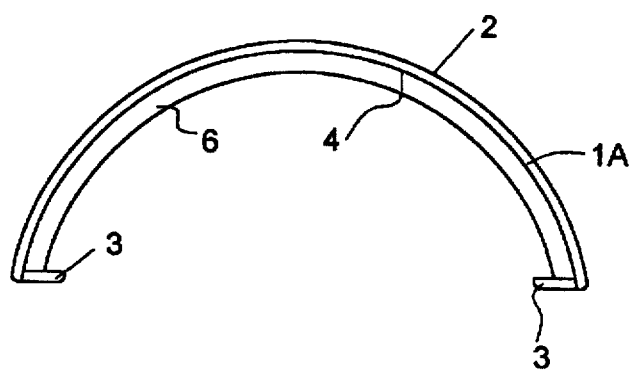
Fig. 9

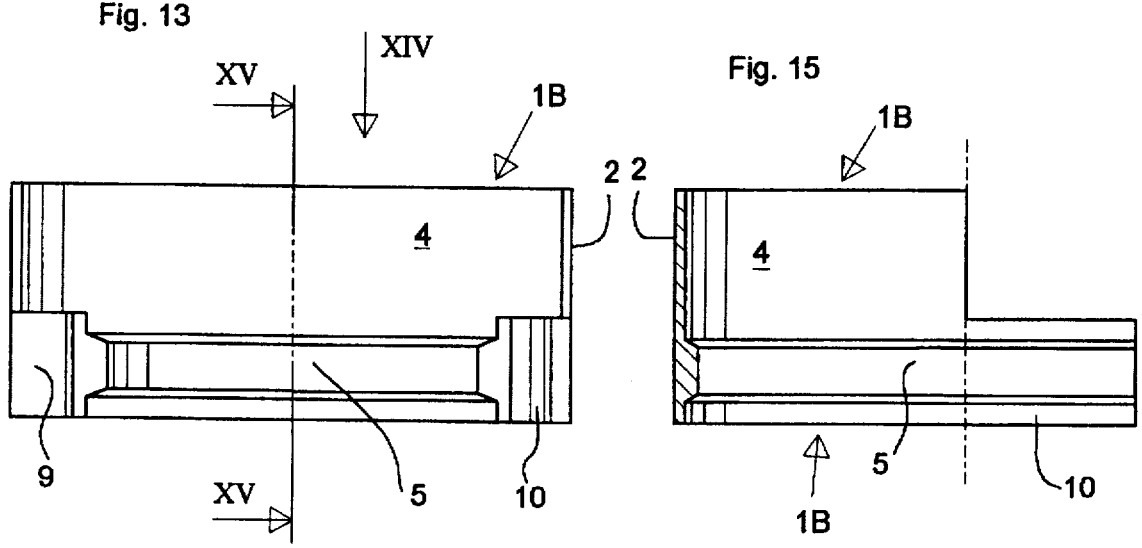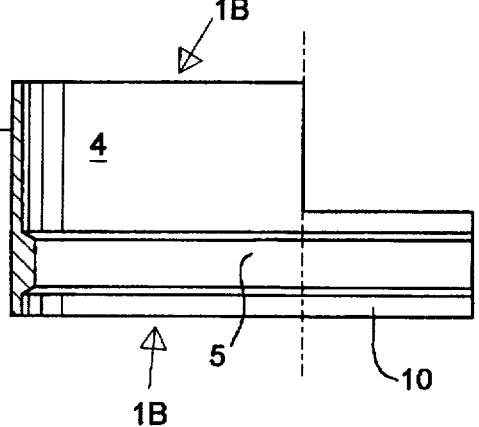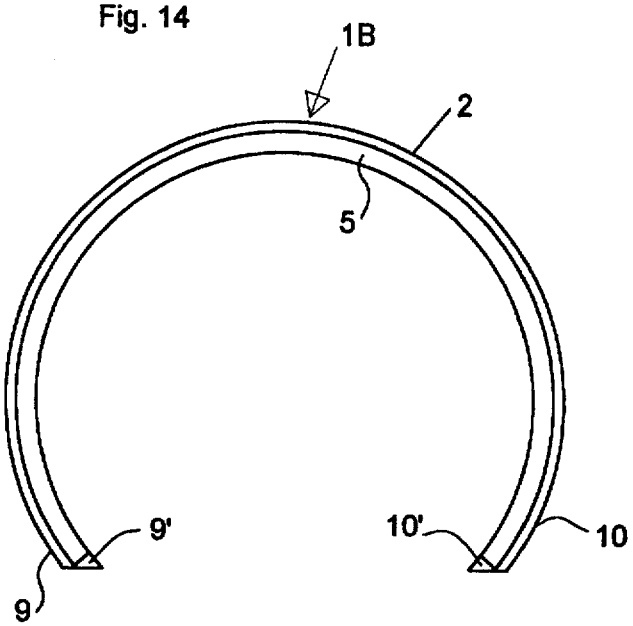

TOOL DATA CARRIER FOR ATTACHMENT TO A TOOL CARRIER

FIELD OF THE INVENTION

The invention relates to a tool data carrier having an outer display surface for displaying specific tool information. The data carrier is constructed for removably securing the data carrier to a tool carrier. The tool carrier is part of a tool exchange system for carrying a tool such as a drill bit, milling tool or the like from a magazine into a machine tool and back again.

BACKGROUND INFORMATION

Tools used especially in fully automatic machine tools are no longer manually exchanged or replaced. Rather, an automatic tool exchange takes place. For this purpose the machine tool is equipped with or cooperates with a program controlled tool exchange system which searches for the required tool in a set of tools held in a magazine. The tool exchange system includes a mechanism for transferring the.selected tool from the magazine into a tool support or tool holder of the machine tool. When a particular tool is no longer needed for a machining operation, the transfer mechanism returns the tool into the magazine. The system includes a number of tool carriers each holding a respective tool. These tool carriers can cooperate with the tool magazine and with the particular machine tool. Each tool carrier carries a particular tool required for the machining of work pieces. The individual tool carriers are standardized to the extent possible particularly with regard to their carrier elements required for storing, transporting, and holding of the respective tool. Generally, such tool carriers comprise a conical section for insertion into a tool holder of the machine tool and a shank section to which a tool is attached. To enable the transfer mechanism to hold the tool carrier during transport from the magazine to the machine tool and back again, a holding collar is secured to the shank section preferably close to the conical section. The holding collar is provided with a groove, such as a V-groove extending radially inwardly. However, only a portion of the groove is required for the holding or gripping of the tool carrier by a gripper of the transfer mechanism. Thus, the holding collar is normally divided into two portions by two axially extending grooves positioned diametrically opposite each other.

Basically, each tool is provided with its own tool carrier. When the tool is no longer needed, the tool and its carrier are both returned into the magazine. In order to retrieve the correct tool when needed again, it is necessary that each tool is precisely identified, for example with regard to its dimensions. For this purpose, the respective tool carriers are identified by a directly attached data carrier such as an adhesive sticker having the required information such as a key number printed thereon or the storage locations are recorded in a list. In both instances the maintaining of a storage of the tool carriers is not satisfactory and leaves room for improvement. For example, the printed data may be lost when a respective sticker data carrier or the like separates from the respective tool carrier. The recording of the information in lists is rather cumbersome because a location search in the list must be made for retrieving the respective tool. Such search is time consuming and mistakes can easily occur, especially with regard to the location of the tool carriers. One cannot assume that such mistakes are avoided.

OBJECTS OF THE INVENTION

In view of the above it is the aim of the invention to achieve the following objects singly or in combination:

to provide a data carrier of the general type described above which assures a certain coordination between a tool carrier and the respective tool that is identified by the data carriers;

to attach the data carrier to the tool carrier in a releasable manner while using the structural features of the tool carrier and the natural or inherent elasticity of the data carrier for the attachment;

the attachment and removal of the data carrier from the tool carrier shall be possible quickly and with certainty while taking advantage of an elastic characteristic of the data carrier; and to construct the data carrier as a snap-on or clip-on connector.

SUMMARY OF THE INVENTION

The data carrier according to the invention is characterized by an elastic segment conforming in its shape to the configuration of the tool carrier to which the data carrier is to be releasably attached. The elastic segment comprises at least one connector element that forms a snap-on or clip-on connector, whereby the data carrier can be releasably secured or attached to the tool carrier with an interlocking form-fit, that secures the data carrier firmly to the tool carrier, but also permits a rapid attachment and removal. The data carrier further comprises a display surface for showing data representing tool information that identifies a tool for a particular milling, drilling or other machining operation. The information may be printed or engraved on the data carrier.

The invention also comprises the combination of the present data carrier with a tool carrier that has a connector area with a given configuration for cooperation with the elastic segment that forms the data carrier. Preferably, the connector area comprises at least one interlocking member such as one or more grooves and/or tongues for cooperation with the snap-on connector of the elastic data carrier segment.

In all embodiments of the invention the data carrier provides with its own elasticity the required interlocking form fit with the tool carrier for a positive attachment of the data carrier to the tool carrier while still permitting the easy removal or exchange of the data carrier. In the preferred embodiment the holding element or elements of the data carrier cooperate with the contour of the tool carrier, whereby such contour may comprise one or more holding members complementing the holding element or elements of the data carrier, whereby the data carrier may be plugged-in or clamped to the tool carrier in an exchangeable manner.

The invention avoids the conventional adhesive bonding between the data carrier and the tool carrier. Separate connecting elements are entirely avoided because the present connection forming components are integral parts of the respective carriers. The structural configuration of the tool carrier is efficiently utilized for the present purposes. In the simplest embodiment the data carrier may encircle the tool carrier over an angular range larger than 180°, thereby connecting the data carrier as a clip-on member to the tool carrier. Thus, the invention utilizes the structural elements that are needed for the transport of the tool carrier for the proper identification of the tool carrier, more specifically of the tool transported by the tool carrier.

The data carrier preferably has such an elasticity that it can clamp itself onto the tool carrier to hold fast against unintended removal of the data carrier. Such elasticity is preferably permanent and sufficient to also hold the data carrier against axial displacement by providing a friction fit of sufficient strength for the just mentioned purposes including preventing an axial displacement. However, it is preferred to provide an inwardly facing locking element as part of the data carrier. The locking element cooperates with a respective member or members on the surface of the tool carrier to prevent relative axial displacement of the data carrier along the tool carrier. A tongue and groove arrangement or a multiple tongue and groove arrangement has been found to be suitable for the present purposes. Such tongue and groove locking elements and members provide the required interlocking form-fit. Preferably, a V-shaped tongue and groove arrangement is used. The tongue can be an integral part of the data carrier or of the tool carrier. Similarly the groove can be an integral part of one of the carriers. Where the tool carrier does not have a groove, but only a collar, it is preferred that the inwardly facing surface of the data carrier is provided with at least one further or additional inwardly extending locking ring so that the collar of the tool carrier is received between two such rings of the data carrier, thereby arresting the data carrier against axial displacement. In another preferred embodiment the data carrier is provided with inwardly reaching locking extensions that engage axial grooves in the tool carrier.

In all embodiments the elastic segment is preferably cut from tubular stock. Preferably, a ring portion is formed to extend over more than 180° to encircle more than half the circumference of the tool carrier. Here again, the elasticity of the segment permits the spreading of the ring portion that forms locking extensions for clipping the elastic segment of the data carrier to the tool carrier or for removing the data carrier from the tool carrier.

BRIEF DESCRIPTION OF THE DRAWINGS

In order that the invention may be clearly understood, it will now be described, by way of example, with reference to the accompanying drawings, wherein:

FIG. 1 shows a side view perpendicularly to the longitudinal axis of a tool carrier having attached thereto a data carrier according to the invention illustrating a first embodiment;

FIG. 2 is a sectional view along section line II—II in FIG. 1;

FIG. 3 is a view as in FIG. 1 showing the data carrier without the tool carrier;

FIG. 4 is a view in the direction of the arrow IV in FIG. 3;

FIG. 5 is a sectional view in the section plane V—V in FIG. 3;

FIG. 8 is a side view illustrating the data carrier of FIG. 6 without the tool carrier;

FIG. 9 is a view in the direction of the arrow IX in FIG. 8;

FIG. 10 is a sectional view in the direction of the section plane X—X in FIG. 8;

FIG. 13 illustrates the data carrier of FIG. 11 without the tool carrier;

FIG. 14 is a view in the direction of the arrow XIV in FIG. 13; and

FIG. 15 is a sectional view along section plane XV—XV in FIG. 13.

Figure 6:
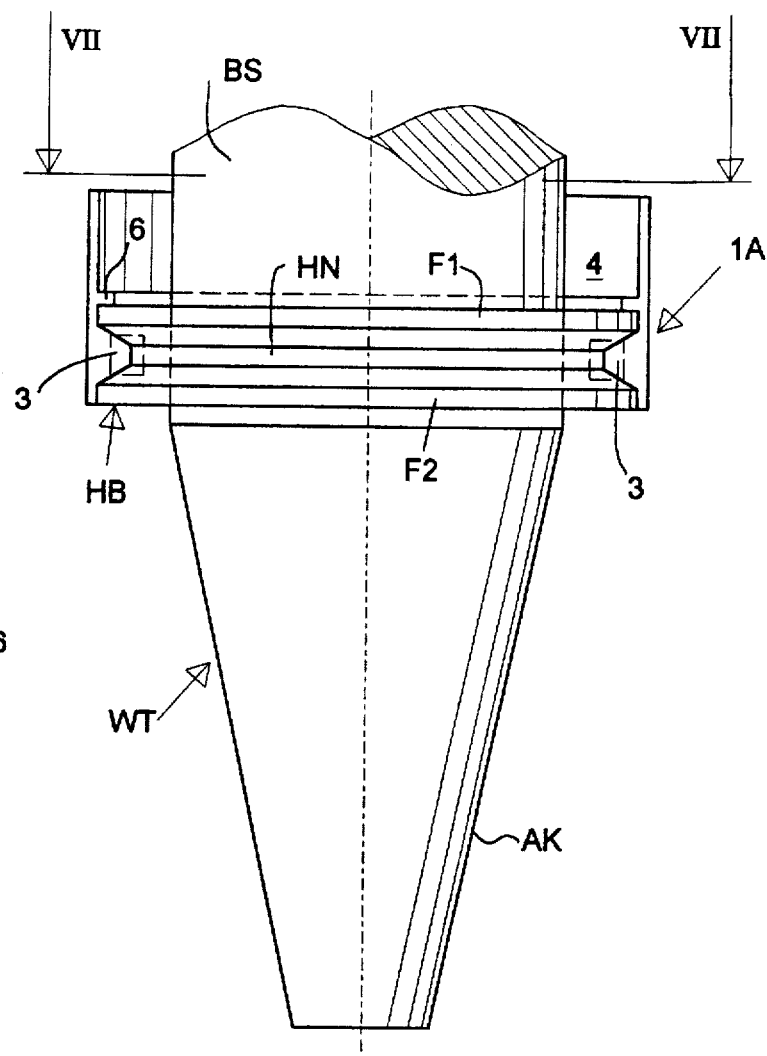
FIG. 6 is a view similar to that of FIG. 1, but showing a second embodiment of the present data carrier with two inwardly reaching locking elements.
Figure 7:
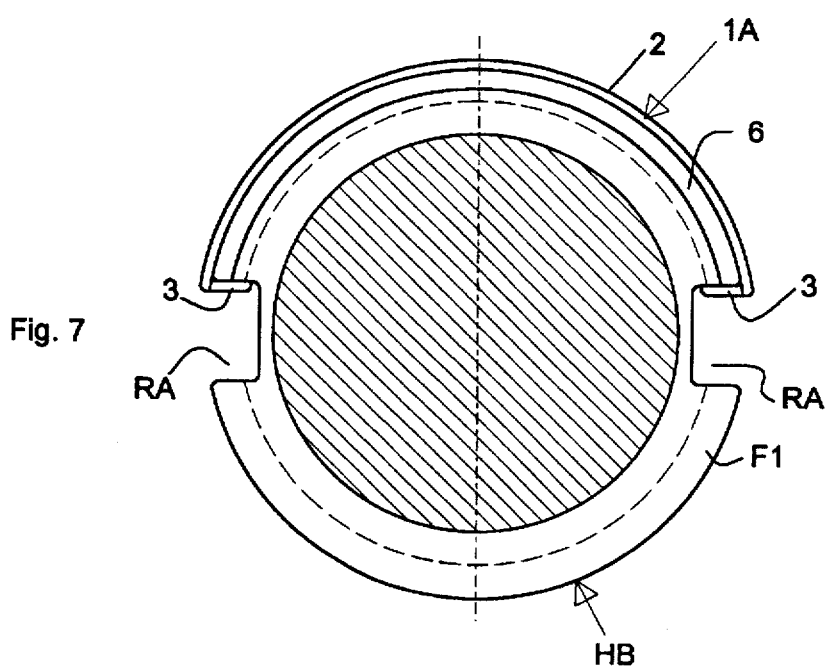
FIG. 7 is a sectional view along section plane VII—VII in FIG. 6.
Figure 11:
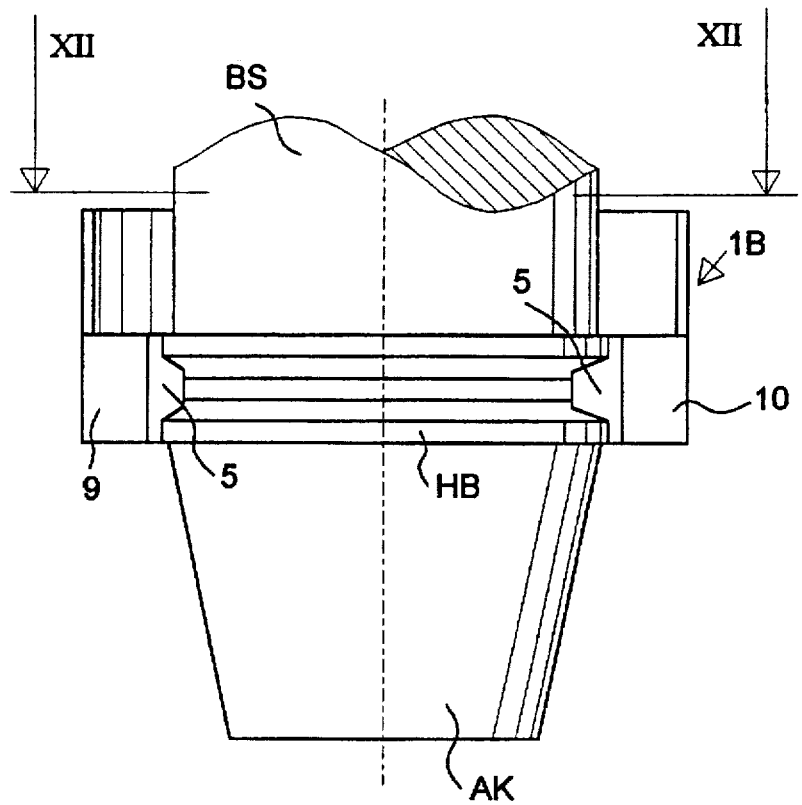
FIG. 11 shows a side view, as in FIG. 1, but illustrating a third embodiment of the present data carrier with ring portions forming clamping extensions.

DETAILED DESCRIPTION OF PREFERRED EXAMPLE EMBODIMENTS AND OF THE BEST MODE OF THE INVENTION

FIGS. 1 to 5 illustrate a first embodiment of the invention and will be described in conjunction. FIGS. 1 and 2 show a tool carrier WT comprising a conical section AK and a tool carrying shank BS. The tool carrier WT is also equipped with a holding collar HB secured to the lower end of the shank BS in any conventional manner or forming an integral part of the shank. The holding collar HB comprises, for example a holding groove HN axially flanked by an upper flange F1 and by a lower flange F2.

As shown, the holding collar HB is formed as a belt pulley, preferably as a V-belt pulley with a wedge-shaped, V-groove HN. According to the invention a data carrier 1 in the form of an elastic segment that may be cut from a pipe section is constructed to conform to the configuration of the holding collar HB. The elastic segment 1 comprises at least one connector element to form a snap-on connector releasably securing the data carrier 1 to the tool carrier WT, or rather to the configuration of the holding collar HB of the tool carrier WT with an interlocking form fit. The data carrier 1 comprises an outer surface 2 providing a display area for showing data representing tool information. The data may be printed, engraved or otherwise applied to the data carrier in any suitable manner.

FIG. 2 shows that the holding collar HB of the tool carrier WT is provided with two axially extending recesses RA serving two purposes. First, the recesses RA in cooperation with the holding groove HN assure a positive gripping of the tool carrier WT by a robot gripper not shown for transporting the tool carrier WT from a magazine into a machine tool and back again. Second, the recesses RA accommodate inwardly bent gripper projections 3 of the data carrier that snap into place due to the elasticity of the elastic segment forming the data carrier 1.

Although the holding collar HB is shown to have a configuration of a V-belt pulley, other configurations may be used for the intended purpose. For example, a single flange F1 or F2 may form the holding collar HB. A single tongue forming a circumferential ridge may form the holding collar HB.

FIGS. 3, 4 and 5 show the data carrier 1 formed as a segment cut from a pipe section that is axially open at both ends and circumferentially interrupted for approximately 180° as best seen in FIG. 4. The so-formed data carrier 1 has an inner surface 4 carrying at least one connector element 5, for example in the form of a radially inwardly facing ridge or tongue 5 so dimensioned that it fits into the above mentioned holding groove HN of the holding collar HB. The radially outwardly facing surface 2 of the data carrier 1 provides ample area for the printing of tool information data. The pipe section from which the segment forming the carrier 1 is cut is made of a material having a sufficient inherent elasticity so that the construction forms a snap-on connector, the elasticity of which assures a positive interlocking form-fit between the holding collar HB and the carrier 1. The ridge or tongue 5 prevents an axial displacement up or down when the ridge 5 is engaged in the V-groove HN. A radially displacement of the carrier 1 away from the tool carrier WT is prevented by the inwardly bent gripper projections 3 which also prevent any circumferential displacement when the projections 3 bear against the sidewall of the respective recess RA.

FIGS. 6 to 10 illustrate a second embodiment. The same components are provided with the same reference numbers. The additional feature in the second embodiment is an arresting element, for example, in the form of a ring portion 6 extending radially inwardly from the inner wall 4 of the elastic segment 1A. This ring portion 6 rests against the upwardly facing surface of the upper flange F1 of the tool carrier WT, thereby restraining the elastic segment 1A against axial downward movement. Further, the ring portion 6 forms together with the tongue 5 a radially inwardly facing groove 7 shaped and dimensioned to receive the upper flange F1. The groove 7 and thus the tongue 5 has a slanting wall 8 conforming to the slant of the holding groove HN for a form-locking fit between the tongue 5 and the groove HN. The groove 7 forms a radially inwardly open recess in the inwardly facing wall 4, whereby the elastic segment is restrainable against movement in both axial directions when the flange F1 of the tool carrier WT engages the groove 7 and the tongue 5 engages the groove HN. Otherwise, the embodiment of FIGS. 6 to 10 functions as described above with regard to the embodiment of FIGS. 1 to 5.

Figure 12:
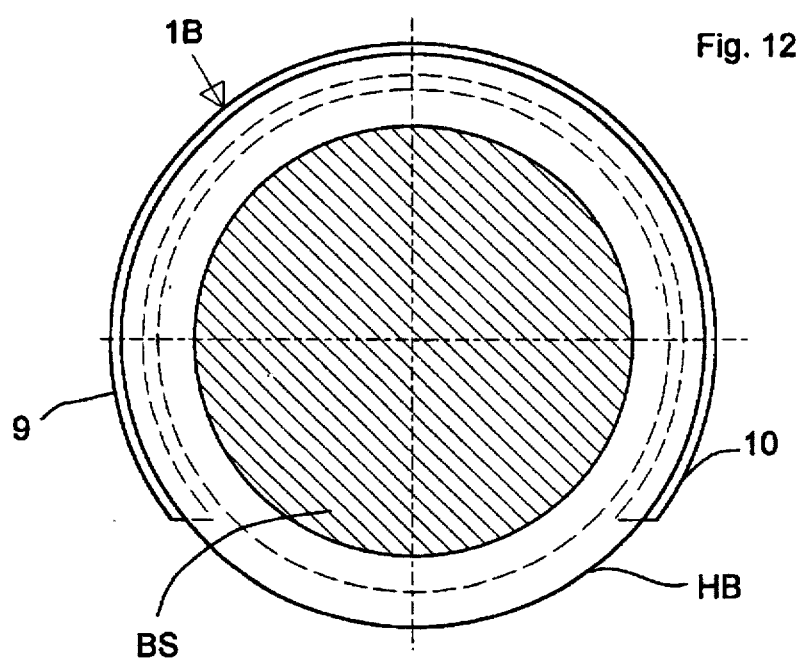
FIG. 12 is a sectional view in the direction of the section plane XII—XII in FIG. 11.

In the third embodiment shown in FIGS. 11 to 15 the modification comprises ring portions 9 and 10 as part of the elastic segment 1B. These ring portions 9 and 10 encircle the holding collar HB for more than 180° as best seen in FIGS. 12 and 14. This feature permits the elastic segment 1B to function as a clip-on device. The extent to which the ring portions 9 and 10 reach beyond 180° will be so selected that the clip-on function is assured while simultaneously permitting the intended easy removal or replacement of the data carrier.

The elastic segment 1B is also provided with a tongue 5 as in the other embodiments. The tongue 5 engages the holding groove HN as described.

The corners 9' and 10' of the ring portions 9 and 10 respectively as seen in FIG. 14, should preferably be removed to facilitate clipping the elastic segment 1B onto the tool carrier WT.

In the simplest embodiment of the invention the data carrier is an elastic clip-on segment that holds itself on the surface of the tool carrier by the inherent elasticity of the clip-on member. The radially inwardly directed elastic force should be sufficient to provide the required form-locking. It is a special advantage of the invention that the data carrier 1, 1A, 1B can be constructed as a shell-shaped cut pipe section, preferably as a half shell section. The outer pipe surface then provides ample area for the display of the relevant tool data or information. These data are also readable after the data carrier has been clipped-on or snapped-on to the tool carrier. The features disclosed herein make the data carrier exceptionally rugged and stable so that accidental loss is prevented and the relevant information relating to the tool carried by the tool carrier is preserved so that the respective tool is positively identified at all times. On the other hand, the present data carrier can be rapidly removed from the tool carrier, thus permitting a quick exchange or replacement so that the data carrier can carry other tools or when the data carrier needs to be removed from the tool carrier for other purposes, such as maintenance or the like.

The present drawings show that the connector elements of the present data carrier are shaped for engaging the configuration of the tool carrier in an elastic releasable manner as described. This applies even to the situation where the tool carrier has a cylindrical surface onto which the data carrier is clipped with the extended ring portions 9, 10 as shown in the embodiment of FIGS. 11 to 15.

Although the invention has been described with reference to specific example embodiments, it will be appreciated that it is intended to cover all modifications and equivalents within the scope of the appended claims.

What is claimed is:

1. A data carrier for attachment to a tool carrier of a tool exchange system for a machine tool, said tool carrier having a given configuration, said data carrier comprising an elastic segment conforming to said configuration, said elastic segment comprising at least one connector element forming a snap-on connector for releasably securing said data carrier to said tool carrier with an interlocking form fit, said data carrier further comprising a display area for showing data representing tool information.

2. The data carrier of claim 1, wherein said at least one connector element is shaped for engaging said configuration in an elastic, releasable manner.

3. The data carrier of claim 1, wherein said elastic segment comprises a circumferentially interrupted and axially open tubular shell section having a radially outwardly facing shell surface forming said display surface provided with said tool information.

4. The data carrier of claim 3, wherein said tubular shell section forms approximately a half shell for encircling said tool carrier over an angle of about 180°.

5. The data carrier of claim 1, wherein said at least one connector element of said elastic segment comprises at least one arresting element for engaging a surface of said tool carrier, whereby said elastic segment is restrainable against axial movement relative to said tool carrier in at least one axial direction.

6. The data carrier of claim 5, wherein said elastic segment comprises an inwardly facing wall, said at least one arresting element comprising a radially inwardly open recess in said inwardly facing wall for engagement by a radially outwardly extending locking member of said tool carrier, whereby said elastic segment is restrainable against movement in both axial directions.

7. The data carrier of claim 5, wherein said elastic segment comprises an inwardly facing wall, said at least one arresting element comprises a radially inwardly projecting flange for engaging into a respective radially outwardly open groove in said tool carrier, whereby said elastic segment is restrainable against movement in both axial directions.

8. The data carrier of claim 7, wherein said radially inwardly projecting flange and said radially outwardly open groove have a V-cross-section.

9. The data carrier of claim 5, wherein said elastic segment comprises a plurality of radially inwardly facing arresting elements for cooperation with respective arresting members of said tool carrier.

10. The data carrier of claim 4, wherein said half shell comprises inwardly bent gripper projections as integral parts of said elastic segment for cooperation with recesses of said tool carrier.

11. The data carrier of claim 3, wherein said tubular shell section forms a ring portion of more than 180° for respectively encircling said tool carrier.

12. A combination comprising a tool carrier of a tool exchange system for a machine tool and a tool data carrier, said tool carrier comprising a connector area having a given configuration, said data carrier comprising an elastic segment conforming to said configuration, said elastic segment comprising at least one connector element forming a snap-on connector cooperating with said connector area thereby releasably securing said data carrier to said tool carrier with an interlocking form-fit, said data carrier further comprising a display area on an outwardly facing surface of said elastic segment for showing data representing tool information.

13. The combination of claim 12, wherein said connector area of said tool carrier comprises at least one interlocking member cooperating with said snap-on connector in securing said data carrier to said tool carrier.

14. The combination of claim 13, wherein said at least one connector element of said elastic segment comprises a radially inwardly facing flange or groove to form said snap-on connector and wherein said at least one interlocking member of said tool carrier comprises a groove or collar cooperating with said snap-on connector to releasably secure said data carrier to said tool carrier.

15. The combination of claim 12, wherein said connector area of said tool carrier comprises two inwardly extending outwardly open recesses positioned approximately opposite each other, and wherein said snap-on connector comprises two inwardly bent integral gripper projections elastically reaching into said recesses to provide said interlocking form-fit.

16. The combination of claim 12, wherein said connector area of said tool carrier comprises a circumferential, radially outwardly facing member, and wherein said elastic segment comprises a tubular shell section forming a ring portion of more than 180°, said ring portion having legs elastically encircling said radially outwardly facing member for more than 180° for releasably securing said data carrier to said tool carrier with said interlocking form-fit.

17. The combination of claim 16, wherein said radially outwardly facing member is a groove forming said configuration of said carrier, said legs of said ring portion engaging said groove with a radially inwardly directed biasing force.

* * * * *